July 16, 1940.   J. G. M. LÓPEZ   2,208,465
PRESSURE REDUCING, FILTERING, AND CONDENSING TOWER
Filed Nov. 10, 1938
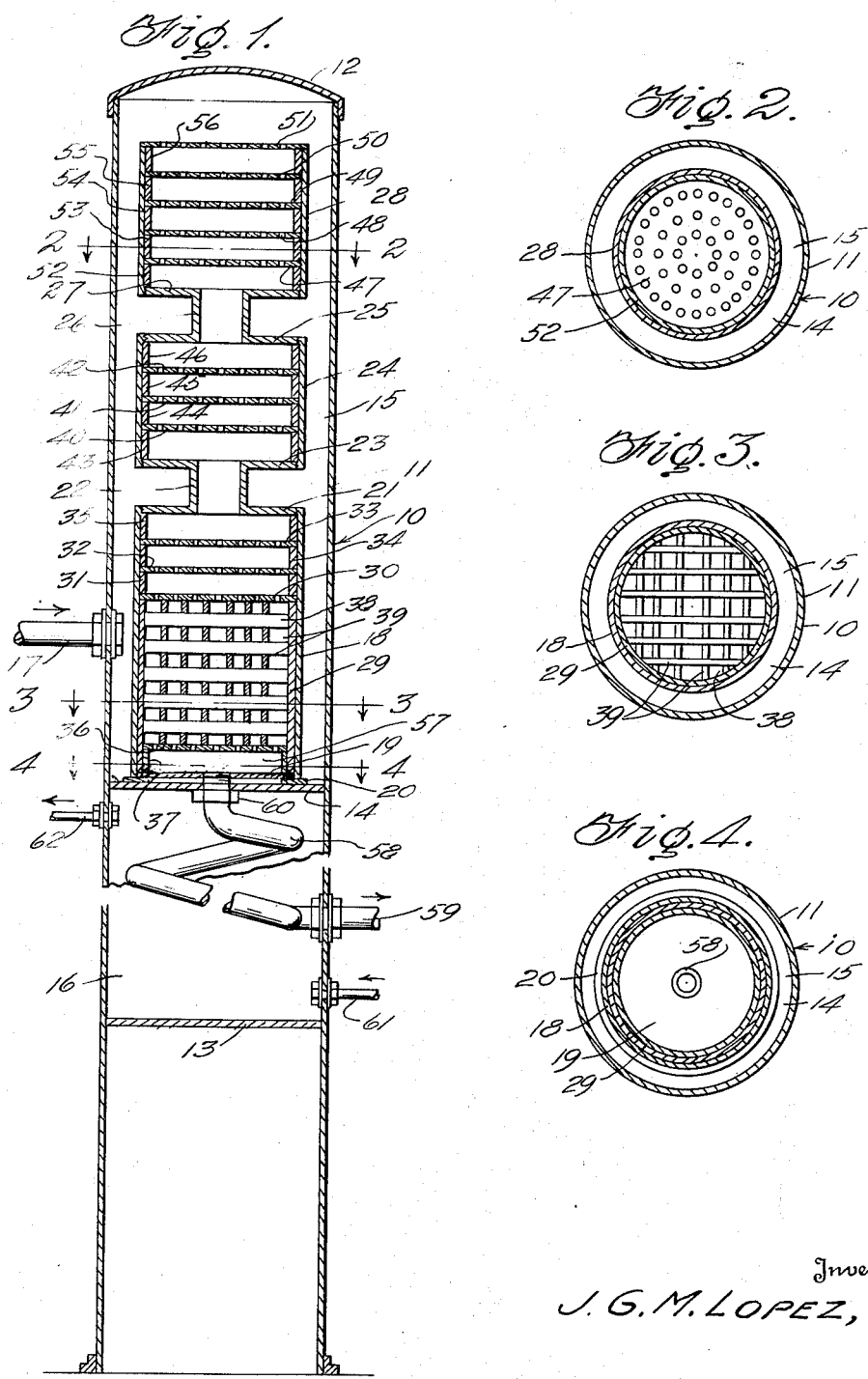
Inventor
J. G. M. LOPEZ,
By Kimmel & Crowell
Attorneys Patented July 16, 1940

2,208,465

UNITED STATES PATENT OFFICE 2,208,465

PRESSURE REDUCING, FILTERING, AND CONDENSING TOWER

Jose Guadalupe Mejia López, Mexico, D. F., Mexico

Application November 10, 1938, Serial No. 239,891
In Mexico May 14, 1938

5 Claims. (Cl. 62—122)

This invention relates to oil refining apparatus, and more particularly to a combined pressure reducing and vapor condensing tower.

An object of this invention is to provide an improved pressure reducing, filtering and condensing tower which is adapted to be interposed in an oil refining system wherein the fluid may be discharged directly from a well or from a separator with the fluid under the well pressure, the device being so constructed as to reduce the pressure of the fluid to a point where the fluid may readily be handled in the remaining steps comprising the refining system.

Another object of this invention is to provide an improved pressure reducing device in a tower connected to a fluid line, the reducing device being formed of a plurality of superposed and interconnected pressure reducing chambers, the lowermost of the pressure reducing chambers including a filtering means for filtering the fluid prior to the discharge of the fluid into a condenser.

A further object of this invention is to provide an improved tower of this type which is so constructed that the pressure reducing portions thereof may be readily removed for cleaning.

To the foregoing objects and to others which may hereinafter appear, the invention consists of the novel construction, combination and arrangement of parts as will be more specifically referred to and illustrated in the accompanying drawing, but it is to be understood that changes, variations and modifications may be resorted to which fall within the scope of the invention as claimed.

In the drawing:

Figure 1 is a vertical section partly broken away of a combined pressure reducing and condensing tower constructed according to an embodiment of this invention, Figure 2 is a sectional view taken on the line 2—2 of Figure 1, Figure 3 is a sectional view taken on the line 3—3 of Figure 1, and Figure 4 is a sectional view taken on the line 4—4 of Figure 1.

Referring to the drawing the numeral 10 designates generally a pressure reducing and condensing tower which is formed of a cylindrical body 11 having a top 12 and a bottom wall 13 which is disposed in upwardly spaced relation to the lower end of the tower body 11. An inner wall or partition 14 is fixedly secured as by welding or the like in the interior of the cylinder 11 and divides the cylinder 11 into an upper vapor chamber 15 and a lower condensing chamber 16.

The upper chamber 15 is provided with an intake connection 17 which is adapted to be connected to a suitable source of fluid supply and the intake 17 is positioned at a point considerably below the upper end of the vapor chamber 15. A tubular or cylindrical member 18 is positioned in the vapor chamber 15 and is provided with a bottom 19 which is adapted to be threaded into the interior of the cylinder 18 and a gasket 20 is interposed between the bottom wall 19 and the partition 14. A plate 21 is threaded into the upper end of the shell or cylinder 18 and a reduced cylindrical connection 22 connects the plate 21 with an upper plate 23. In practice, the plate 21 is adapted to be welded or otherwise fixedly secured to the tubular connection 22 and the plate 23 is adapted to be fixed to the upper end of the connection 22. The plate 23 is threaded into the lower end of a cylindrical or tubular shell 24 and an upper plate 25 is threaded into the upper end of the cylindrical shell 24. A reduced tubular connection 26 is fixed to the plate 25. A bottom plate 27 is fixed to the upper end of the connection 26 and is threaded into the lower end of an upper cylindrical member 28.

The cylindrical member 18 comprises a combined pressure reducing and filtering member and is provided with an inner cylindrical member 29 which at its lower end rests on the bottom plate 19 and a perforate pressure reducing plate 30 is disposed on the upper end of the inner shell 29. A cylindrical ring 31 in the form of a spacing ring is positioned on top of the lower perforate plate 30 and a second plate 32 engages on the top of the spacer ring 31. An upper perforate plate 33 is spaced from the plate 32 by means of a spacer ring 34 and a ring 35 engages on top of the plate 33 and contacts with the plate 21 so that when the shell 29 is tightened by the threading of the bottom 19 and the plate 21 is threaded downwardly into the outer shell 18 the perforate plates 30, 32 and 33 will be tightened within the outer shell 18. A lower perforate plate 36 is positioned in the lower portion of the inner shell 29 and is held in upwardly spaced relation to the bottom plate 19 by an inner spacing ring 37.

The space between the lower perforate plate 36 and the plate 30 forms a filtering chamber 38 within which a plurality of bars 39 are positioned. The bars 39 are placed in layers with the bars of each layer in parallel and spaced relation and the bars of one layer disposed at right angles to the bars of a preceding and a succeeding layer.

The intermediate pressure reducing member 24 comprises a plurality of perforate plates 40, 41 and 42 which are held in spaced apart relation to each other and to the upper and lower walls of the outer shell 24 by means of spaced rings 43, 44, 45 and 46.

The upper pressure reducing chamber or member 28 is provided with perforate plates 47, 48, 49, 50 and 51. The perforate pressure reducing plates in the upper member 28 are held in spaced apart relation by spacer rings 52, 53, 54, 55 and 56. The upper plate 51 is preferably threaded into the upper end of the outer member 28 and when this member 51 and the bottom wall member 27 are threaded inwardly of the cylindrical member 28, the spacer rings and the perforate pressure reducing plates are tightly secured within the member 28.

The fluid passing downwardly through the pressure reducing member comprising the chambered members 18, 24 and 28 enters a lower chamber 57 and the upper end of a condensing coil 58 is secured to the bottom wall 19 and the fluid will pass downwardly through the coil 58 and then flow through the outlet 59 to the remaining portion of the refining system. The coil 58 is tightly secured to the plate 14 by means of a nut 60 which serves not only to hold the coil 58, but also to hold the superposed pressure reducing chambers in assembled relation. The condensing chamber 16 is adapted to be filled with water or other like fluid and the water is circulated in the chamber 16 by an inlet 61 connected to a suitable source of water supply and passes out through an outlet 62 positioned adjacent the upper portion of the condensing chamber 16.

In the use and operation of this combined pressure reducing and condensing tower, the vaporized fluid which may also contain a quantity of the lighter components which may be in liquid form is adapted to enter the vapor chamber 15 through the intake pipe 17. The vapor will rise upwardly in the chamber 15 under the pressure of the vapor and will then enter the uppermost reducing chamber 28 through the perforate plate 51. The fluid will then pass downwardly through the connecting nipple 26 and then enter the intermediate chamber 24. The intermediate chamber 24 has a smaller number of plates than the upper chamber 28 and after passing through the intermediate chamber 24 the fluid will pass downwardly through the reduced nipple 22 and then enter the lowermost pressure reducing and filtering chamber 18. After passing through the filtering device comprising the cross bars 39 the fluid will enter the lower chamber 57 and then pass downwardly through the condensing coil 58 and out through the outlet 59. A tower constructed according to this invention has been placed in actual use and has been found to reduce a considerable portion of the gases emanating from a gas well to a liquid which contains a considerable quantity of the higher hydro-carbon components and the liquid is initially in the form of a crude gasoline which is adapted to be passed through a fractionator forming part of the refining process embodied in my co-pending application on oil refining process and also my co-pending application on an improved fractionator filed on even date herewith.

What I claim is:

1. A combined reducing, filtering and condensing tower for use in an oil refining system, comprising a cylindrical tower, a partition dividing said tower into an upper vapor chamber and a lower condensing chamber, a plurality of superposed cylindrical housings in said upper chamber, reduced connecting means communicating said housings with each other, the uppermost of said housings communicating with the upper portion of said upper chamber, filter means carried by the lowermost of said housings, and perforated pressure reducing plates carried by each of said housings.

2. A combined reducing, filtering and condensing tower for use in an oil refining system, comprising a cylindrical tower, a partition dividing said tower into an upper vapor chamber and a lower condensing chamber, a plurality of superposed housings in said upper chamber, reduced nipples connecting said housings together, a plurality of spaced apart perforate plates in each housing, and cylindrical means loose in each housing maintaining said plates in spaced apart relation.

3. A combined reducing, filtering and condensing tower for use in an oil refining system, comprising a cylindrical tower, a partition dividing said tower into an upper vapor chamber and a lower condensing chamber, a plurality of superposed housings in said upper chamber, reduced nipples connecting said housings together, a plurality of spaced apart perforate plates in each housing, and means maintaining said plates in spaced apart relation, said means comprising cylindrical spacer members disposed in said housings.

4. A combined reducing, filtering and condensing tower for use in an oil refining system, comprising a cylindrical tower, a partition dividing said tower into an upper vapor chamber and a lower condensing chamber, a plurality of superposed cylindrical housings in said upper chamber, end walls threaded into said housings, reduced nipples connecting adjacent end walls together, spaced apart perforate plates in each housing, cylindrical spacer rings loose in each housing for spacing said plates apart, and a filter means in one of said housings.

5. A combined reducing, filtering and condensing tower for use in an oil refining system, comprising a cylindrical tower, a partition dividing said tower into an upper vapor chamber and a lower condensing chamber, a plurality of superposed cylindrical housings in said upper chamber, end walls threaded into said housings, reduced nipples connecting adjacent end walls together, spaced apart perforate plates in each housing, and cylindrical spacer rings loose in each housing for spacing said plates apart, superposed right angularly related filter bars disposed in the lowermost of said housings.

JOSE GUADALUPE MEJIA LÓPEZ.